United States Patent [19]

Allen

[11] Patent Number: 4,849,834
[45] Date of Patent: Jul. 18, 1989

[54] READ CHANNEL ARCHITECTURE FOR PROCESSING READ HEAD SIGNALS

[76] Inventor: David M. Allen, 9839 Connell, Overland Park, Kans. 66212

[21] Appl. No.: 893,973

[22] Filed: Aug. 7, 1986

[51] Int. Cl.$^4$ .......................... G11B 5/09; G11B 5/102
[52] U.S. Cl. .......................................... 360/46; 360/67
[58] Field of Search ..................................... 360/67, 46

[56] References Cited

U.S. PATENT DOCUMENTS 4,495,529  1/1985  Gustatson ............................. 360/67
4,517,610  5/1985  Minuhin ................................ 360/46

Primary Examiner—Vincent P. Canney

[57] ABSTRACT

A read channel circuit includes a high frequency filter and a pair of differentiators, one of which is a high resolution differentiator and the other of which is a low resolution differentiator intentionally adjusted to perform its differentiation function imperfectly. Comparators serve as zero crossing detectors for the high and low resoltuion signals. The comparator for the low resoltuion path provides the data input to a flip-flop. The comparator for the high resolution path has its output processed by an exclusive OR gate and a delay circuit before being applied to the clock input of the flip-flop. The high-resolution and low-resolution paths are combined in the flip-flop, whose digital output faithfully reproduces the binary information received by the read head by deriving timing from the high-resoltuion path and by effectively discriminating against artifacts in the read head's signal which would result in spurious transitions in the read channel's output were it not for the imperfect differentiation provided in the low-resolution path.

3 Claims, 1 Drawing Sheet

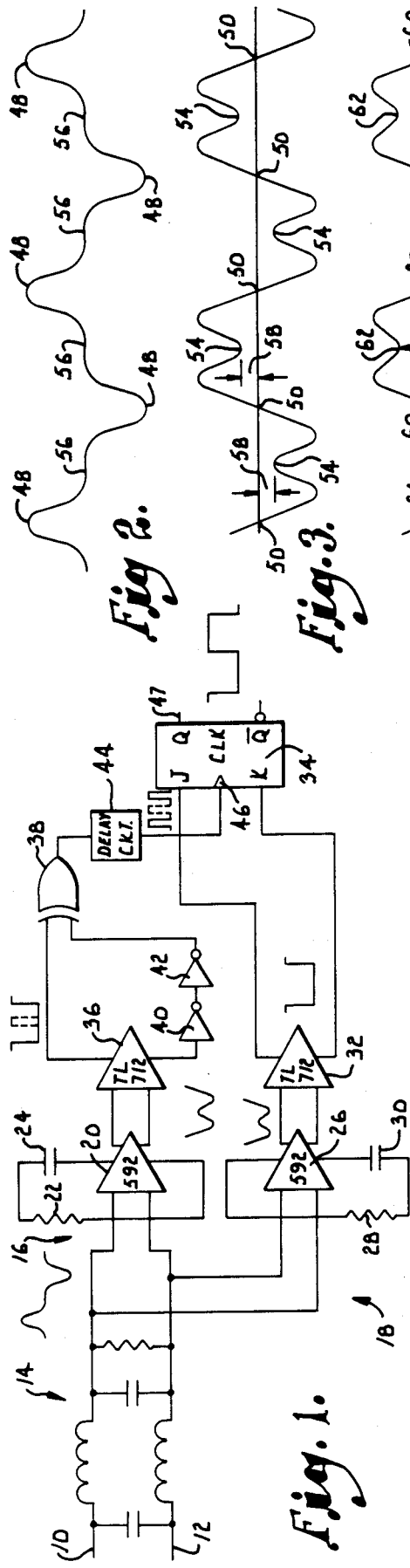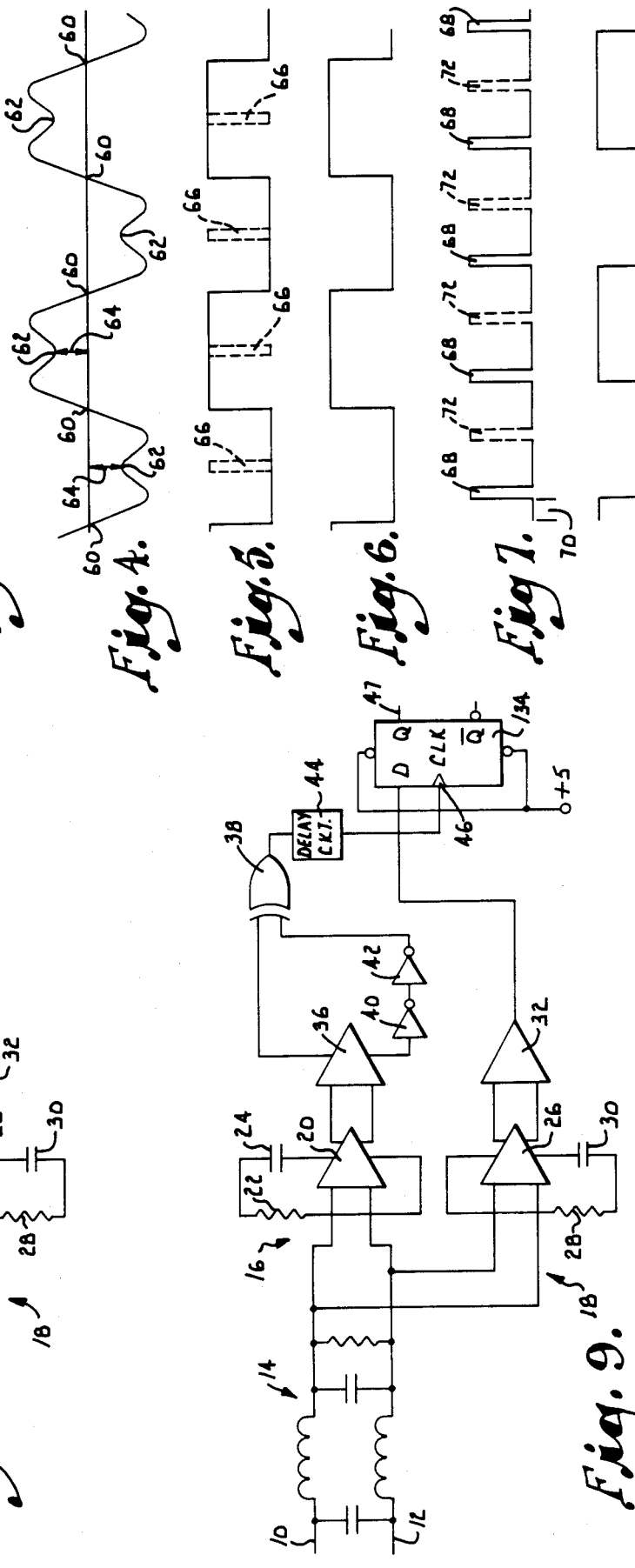

READ CHANNEL ARCHITECTURE FOR PROCESSING READ HEAD SIGNALS

BACKGROUND OF THE INVENTION

This invention relates generally to the retrieval of data recorded on magnetic media and deals more particularly with improved circuitry for processing electrical signals generated by a read head.

The recording of data on magnetic media such as disks and tapes is normally carried out by entering the encoded data as a continuous track of magnetization having polarity reversals at intervals determined by the data that is being recorded and by the rules of the particular encoding and recording processes that are employed. In current disk and tape systems, the recorded data are recovered by sensing polarity reversals, i.e., the presence, absence and relative position of each change in polarity. It is only the polarity changes that are important, not the polarity itself. The polarity reversals are commonly referred to as flux transitions and are detected by using an inductive read head. When the magnetized track of data is moved past the sensitive gap of the read head, current is induced to flow and the read head thus generates a small voltage pulse each time an area of flux transition passes through the read head gap.

The pulses which are thereby generated are amplified and converted by read channel circuitry into a binary signal suitable for use by data processing equipment. The read channel circuitry must be capable of performing this conversion in spite of numerous signal distortions and corruptions that can occur during both normal and abnormal operation of the equipment. Included among the problems that are often encountered is the loss of signal amplitude which can occur for a variety of reasons. In order to make the read channel circuit immune to amplitude loss, two general approaches have been taken. One is to use automatic gain control and the other involves designing the read channel circuit in a manner to be intrinsically insensitive to the amplitude of the signal. The need for automatic gain control adds to the cost and complexity of the circuitry, while amplitude insensitive circuits have problems of their own, as will be discussed more fully.

Many read channel systems in current use have basically the same architecture, although the specific implementations vary rather widely. The read channel circuitry typically includes one or more gain stages, a lowpass filter for attenuating unwanted frequencies, a differentiator for differentiating the signal, and a zero crossing detector. The circuit is arranged to detect the voltage peaks in the read channel's signal which correspond to flux transitions, and its performance is best at high flux densities, but has a serious shortcoming at the low flux densities of a given system. Whether the polarity is positive or negative is not important, and the amplitudes of the pulses are also ignored. The function of the differentiator is to convert the peaks, both positive and negative, to zero crossings, and the zero crossing detector is normally implemented with a conventional comparator which detects zero crossings of the differentiated signal.

In order to make efficient use of the recording space on the magnetic media, self clocking codes are usually used because they avoid the need for separate clock information to be recorded on a separate track or other separate portion of the medium. These self-clocking codes include FM, MFM, GCR and RLL code schemes. In the self-clocking codes, data and clock information are mixed together and recorded on the same track. Mixing of data and clock information together increases the flux density on the medium but not unduly if the self clocking code is well designed. FM code was used in the past but has now been supplanted by MFM code which is more efficient and perhaps the most widely used code at present. A newer class of codes referred to as RLL (run length limited) codes have recently evolved and exhibit efficiency improvement over MFM. At the same time, the characteristics of the RLL codes are especially compatible with web-coated magnetic recording media and with state of the art electronic components.

The efficiency gains of the RLL codes are achieved in part by broadening the bandwidth that is required to process the RLL signal in the read channel. The bandwidth is commonly expressed as the ratio of the highest frequency or flux-densities to the lowest frequency or flux-densities of the fundamental signals, and it has a significant impact on the read channel circuitry design. An unfortunate shortcoming of the differentiator circuit when used as a peak detector is that it is most accurate on the highest flux densities and less accurate on the lower densities used in any given system. MFM has a relatively narrow bandwidth of 2:1, and this gives the differentiator little trouble. However, the greater 2.67:1 bandwidth of RLL noticeably worsens the performance of the differentiator, and the GCR bandwidth of 3:1 makes it worse yet. The reason for the problem is the "saddle" shape that the differentiated signal acquires as the spread between the lowest and highest frequencies increases and the flux-transitions are spread farther apart in time. The middle or "notch" of the "saddle" shaped signal can approach or even cross zero, especially when noise is considered, and it can then be interpreted as a flux transition when in fact it is not. The problem of spurious zero crossings in the signal is most acute with the more efficient codes such as RLL.

Although at least two popular approaches have been taken to solving this problem, neither has been wholly successful and both incur a substantial increase in circuit complexity. One approach involves implementing two parallel filters for filtering of the signal. One filter is used as a high resolution filter which attenuates only the high frequency noise with little effect on the desired signal. The other filter is a low resolution filter which attenuates the portion of the signal at the high end of the signal's band width. The low resolution filter reduces the depth of the notch in each "saddle" portion of the differentiated signal by reducing the amplitude of the high frequency component which is superimposed on a low frequency component to create the "saddle" shape. The high resolution signal retains the system resolution and timing accuracy and is applied as a digitized clock signal to a type D flip flop which also receives the low resolution signal as its data input. The spurious peaks which are eliminated from the low resolution signal are in this manner ignored by the flip flop even though present in the high resolution clock signal. The overall result is that advantage is taken of the high resolution signal for timing purposes while the benefit of low resolution discrimination against false peaks is achieved at the same time.

Despite these advantages, the dual filter approach does not provide a wholly successful solution to the false peak problem. The need for two separate filters adds significantly to the cost of the circuitry, particularly since the filters typically employ relatively expensive inductors. The added components of the second filter also take up valuable space on the circuit board of the system. Perhaps even more importantly, the different frequency responses and resolution capabilities of the two filters makes them unavoidably mismatched in their phase response characteristics, and this often results in significant degradation of the performance of the system. The signal timing is dependent on the propagation delays of the two filters, among other things, and the propogation delay can vary substantially depending on the data involved and other variables. As a consequence, the dual filter system is subject to pattern sensitivity which detracts from its ability to give consistent results under the operating conditions it can be expected to encounter. This situation is tolerable for systems such as MFM which have narrow handwidth but is accelerated by wide-band width codes, such as RLL and GCR for which the technique usually becomes unworkable.

The second approach that has been taken to overcome the false peak problem takes advantage of the fact that the instantaneous amplitude of a true (i.e., not "false") peak, prior to differentiation, is always well above or well below zero, whereas the amplitude of a "false" peak is usually at or near zero. This approach typically involves using a pair of amplitude comparators to detect the amplitude of the undifferentiated signal and logic gating which ignores false peaks by rejecting zero crossings in the differentiated signal that occur at the same time that the undifferentiated signal has an amplitude below the threshold of the comparators.

This type of system is plagued by added cost and circuit complexity resulting from the need for the amplitude comparators and related components. Even more significantly, the system is amplitude sensitive and the whole system will fail if the amplitude drops below the comparator threshold for some reason. Therefore, accurate control of the signal amplitude is crucial, and it is usually necessary to include automatic gain control or similar circuitry in order for the system to operate successfully. The need for additional components to control the amplitude adds to the cost, complexity and space requirements of the read channel circuit. Even with automatic gain control, the system is not infallible.

SUMMARY OF THE INVENTION

The present invention is directed to an improved read channel circuit in which the false peak problem is essentially eliminated without any significant sacrifice in reliability or cost. In accordance with the invention, a single high resolution filter is used to filter out the high frequency noise from the read head signal. The filtered signal is then passed through two separate differentiator circuits, one of which is adjusted to be imperfect in its differentiation to thereby reduce the depth of the notch in the saddle shaped signal that results from differentiation. This imperfect differentiation displaces the false peaks well away from zero in the differentiated signal and provides an effective margin against false zero crossings. The other differentiator is a conventional, high-resolution differentiator having its output applied to a zero crossing detector and then to an exclusive OR gate and a delay circuit before being applied as the clock signal to a JK or D type flip flop. The output from the low-resolution differentiator is thereafter conventionally applied to a zero crossing detector and then to the data input of the flip flop. The pole of the high-resolution is typically 10 times the highest signal frequency, while the pole of the imperfect, low-resolution filter is placed typically only at 2 or 3 times the highest signal frequency.

The read channel circuit is thus arranged in a unique manner to take full advantage of the high-resolution signal for effective timing and the low-resolution signal for its discrimination against spurious zero crossings. At the same time, no additional filters are required and there is no phase-response mismatching or significant extra costs or space requirements. The added differentiator is low cost and uses readily available component. In addition, the system is relatively insensitive to amplitude so there is no need to maintain control over the signal amplitude.

Contrary to the conventional practice of using high accuracy differentiators in circuits of this type, I have found that the use of an intentionally imperfect differentiator provides highly beneficial results in that it provides a significant margin against false zero crossings by reducing the notch depth of the saddle shaped wave form in the differentiated signal. This unexpected result allows my read channel circuit to function effectively with fewer components, lower costs and more reliability than the read channel circuits that others have devised.

DESCRIPTION OF THE DRAWING

In the accompanying drawing which form a part of the specification and is to be read in conjunction therewith and in which like reference numerals are used to indicate like parts in the various views:

FIG. 1 is a schematic diagram of a read channel circuit constructed according to a preferred embodiment of the present invention;

FIG. 2 is a diagrammatic view of a typical waveform generated by an inductive read head used in the retrieval of encoded data from magnetic recording media;

FIG. 3 is a diagrammatic view of the waveform of FIG. 2 after high resolution differentiation;

FIG. 4 is a diagrammatic view of the waveform of FIG. 2 after low resolution differentiation;

FIG. 5 is a diagrammatic view of the high resolution signal after having passed through the comparator stage of the circuit, with the broken lines illustrating spurious peaks caused by false zero crossings;

FIG. 6 is a diagrammatic view of the low resolution signal after having passed through the comparator stage of the circuit;

FIG. 7 is a diagrammatic view of the signal of FIG. 5 after having passed through the exclusive OR gate and the delay stage of the circuit, with the broken lines illustrating the spurious peaks;

FIG. 8 is a diagrammatic view of the output signal of the circuit; and

FIG. 9 is a schematic diagram of a read channel circuit constructed and arranged according to an alternative form of the invention.

DETAILED DESCRIPTION OF THE INVENTION

Referring now to the drawing in more detail and initially to FIG. 1, a read channel circuit constructed and arranged in accordance with the present invention includes input lines 10 and 12 which receive the signal generated by a conventional inductive read head of the type commonly used in the reading of stored data from a magnetic medium such as a disk or tape. The read head has a sensitive gap which senses each flux transition in the magnetic recording track on the medium. Each flux transition which passes the sensitive gap results in the generation of a small voltage pulse, and it is this pulsed signal which is applied to the input lines 10 and 12.

The read channel circuit includes a conventional filter which is generally designated by numeral 14 and which functions to filter high frequency noise from the signal. After passing through the filter 14, the filtered signal is applied to a pair of differentiator circuits 16 and 18. Differentiator 16 is a high resolution differentiator which includes a conventional differential amplifier 20 and an RC circuit formed by a resistor 22 and a capacitor 24. The components of the high resolution differentiator circuit are adjusted to accurately differentiate the filtered signal which is input to the differential amplifier 20.

The other differentiator circuit 18 is a low resolution circuit which includes a differential amplifier 26 in combination with a resistor 28 and a capacitor 30. The resistance of the resistor 28 and the capacitance of capacitor 30 are selected such that the differentiation function performed by the differentiator circuit 18 is imperfect. As will be explained more fully, this imperfection provides a margin against spurious zero crossings in the differentiated signal in order to eliminate spurious peaks.

The output signal from the differentiator circuit 18 is applied to a comparator 32 which functions as a zero crossing detector. Comparator 32 is preferably a high speed comparator, and its output lines are connected with the J and K inputs to a conventional JK flip flop 34. The data inputs to the flip flop 34 are thus provided by comparator 32.

The output signal from the high resolution differentiator circuit 16 is similarly applied to a high speed comparator 36 which functions as a zero crossing detector. One output line from comparator 36 is applied as one input to an exclusive OR gate 38, while the other comparator output is applied to a pair of inverters 40 and 42 and then to the second input of gate 38. The output signal from gate 38 is applied to a delay circuit 44 which functions to delay the signal applied to it by a preselected time which, in the preferred embodiment, is approximately half of the minimum distance between flux-transitions. The output from the delay circuit is applied to the clock terminal 46 of the JK flip flop 34. The Q output line of flip flop 34 is indicated by numeral 47.

In operation of the read channel circuit, the wave form from the read head is passed through the high frequency filter 14, and the filtered signal typically has the "head and shoulders" shape shown in FIG. 2. In the FIG. 2 waveform, each peak 48 (positive or negative) represents a flux transition in the magnetic recording track which is being read by the read head.

The differentiation that is carried out by the high-resolution differentiator circuit 16 generates the saddle-shaped wave-form illustrated in FIG. 3. Since each peak 48 in the FIG. 2 wave form has a slope of zero, the differentiated signal shown in FIG. 3 crosses a value of zero at locations 50 which correspond to the peaks in the undifferentiated signal. Each saddle shape in the differentiated signal includes a "notch" 54 which corresponds to a "shoulder" 56 in the undifferentiated signal of FIG. 2. Since each shoulder 56 has a slope near zero, there is only a small gap 58 between each of the notches 54 and the value of zero. When noise and other signal distortions are present, the notches 54 can closely approach and even cross the value of zero in some instances, and this can cause a false zero crossing which can be detected as a spurious peak corresponding to a flux transition when in fact no flux transition is present.

The differentiated signal produced by the low resolution differentiator circuit 18 is the saddle shaped circuit shown in FIG. 4. Zero crossings in the FIG. 4 wave form are present at the areas 60 which correspond to the peaks 48 in the undifferentiated signal. Again, each saddle shaped wave in the FIG. 4 signal has a notch 62. However, because of the imperfect manner in which the signal is differentiated by the low resolution differentiator circuit 18, each notch 62 is displaced from a value of zero by a gap 64 which is considerably greater than each of the gaps 58. The imperfection in the differentiation creates more of a margin against the detection of a false zero crossing because the slope of each shoulder 56 is reproduced as being farther away from zero than it actually is. In this manner, the relatively large gaps 64 provide a significant margin against the detection of false zero crossings in the low resolution FIG. 4 signal.

FIG. 5 depicts a square wave signal which is generated by comparator 36. In the FIG. 5 signal, each side of each square wave is generated by the detection of one of the zero crossings 50 in the differentiated signal of FIG. 3. Spurious pulses are identified by numeral 66 in FIG. 5, and the spurious pulses 66 are generated in those instances where each notch 54 in the differentiated signal closely approaches (or crosses) a value of zero such that the gap 58 essentially disappears and the notch is detected as being a zero crossing. The spurious pulses 66 thus represent false peaks in the waveform generated by the read head.

FIG. 6 depicts a square wave signal which is produced on the output side of comparator 32. Each side of each wave in the FIG. 6 signal is formed by the detection of a zero crossing 60 in the differentiated signal of FIG. 4. It is noted that the gaps 64 are great enough that none of the notches 62 is interpreted as a false zero crossing, and there are thus no spurious pulses in the FIG. 6 waveform.

After the output signal from comparator 36 has been processed by the exclusive OR gate 38 and the delay circuit 44, it assumes the form shown in FIG. 7. Gate 38 converts each signal transition to a pulse 68. Each pulse 68 shown in the FIG. 7 signal represents a flux transition in the read head signal, and the gap 70 represents the time delay created by the delay circuit 44. The delay is for the purpose of assuring that the data signals are applied to the J and K inputs of flip flop 34 at the time of application of the clock signal at terminal 46. The signal of FIG. 7 includes spurious pulses 72 which are present due to the presence of the spurious pulses 66 in the signal shown in FIG. 5.

The low resolution signal shown in FIG. 6 is applied to the J and K data inputs of flip flop 34, while the high resolution signal of FIG. 7 is applied to the clock terminal 46 of the flip-flop. Because the low resolution data signal to flip-flop 34 is devoid of spurious pulses, the spurious pulses 72 that are present in the high resolution path (clock input) do not cause the flip-flop to change state, and the spurious pulses are eliminated in the output of the flip-flop 34. By combining the low and high resolution signals in the flip-flop, the output applied to the Q output line of the flip-flop takes the form of the square wave signal shown in FIG. 8, and the spurious pulses are eliminated by the flip-flop.

In this manner, the read channel circuit takes full advantage of the accurate timing provided by the high resolution differentiator circuit 16 and the good discrimination against false peaks that is provided by the low resolution differentiator circuit 18. At the same time, the circuit is relatively insensitive to amplitude of the input signal and requires only the single filter 14. The added differentiator circuit that is required is formed by conventional off the shelf items that do not add appreciably either to the cost or the space requirements of the circuit. Additionally, there is only minimal phase mismatching in the outputs from the two differentiator circuits, so the phase responses of the differentiators do not create significant problems due to mismatching.

These advantages are obtained by intentionally adjusting the low resolution differentiator circuit 18 such that it performs its differentiation function imperfectly in order to provide the unexpected result of an improved margin against false zero crossing in the differentiated output signal from circuit 18.

FIG. 9 illustrates an alternative read channel circuit which is arranged for the most part identically to the circuit shown in FIG. 1. The only difference is that the FIG. 9 circuit uses a D type flip-flop 134 having its data input D tied to the output from the comparator 32 for the low resolution path. The output from the delay circuit 44 is applied to the clock input 46. As is the case with the JK flip-flop 34, the D type flip-flop 134 uses the high and low resolution signals to eliminate the effects of spurious pulses that may be generated by the detection of false peaks in the read head signal. It is important to recognize that either the JK flip-flop 34 or the D type flip-flop 134 can be used in the circuit, as can other components which provide the same function.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A read channel circuit for processing a waveform from a magnetic read head, said read channel circuit comprising:

a filter connected to receive the waveform and operable to filter selected frequencies therefrom to provide a filtered output signal;

a first differentiator circuit connected to receive said filtered signal and operable to differentiate same to provide a first differentiated signal crossing a value of zero at locations corresponding to peaks of the waveform and having notch portions which at least approach a value of zero at off peak areas of the waveform;

a second differentiator circuit connected to receive said filtered signal and having a state of adjustment to imperfectly differentiate the filtered signal to provide a second differentiated signal crossing a value of zero at locations corresponding to peaks of the waveform and having notch portions which depart from a value of zero at said off peak areas to a greater extent than the notch portions of said first differentiated signal;

a first zero crossing detector connected to receive the first differentiated signal and to detect the zero crossings of same, said first zero crossing detector having an output which may include spurious pulses resulting from misinterpretation of said notch portions of the first differentiated signal as zero crossings;

a second zero crossing detector connected to receive the second differentiated signal and to detect the zero crossings of same, said second zero crossing detector having an output which is substantially devoid of said spurious pulses;

means for using the output of said second zero crossing detector as a data signal; and means for using the output of said first zero crossing detector as a clock signal for the data signal to generate an output signal therefrom which is devoid of spurious signals.

2. In a read channel circuit having a filter providing a filtered signal from a waveform generated by a magnetic read head which senses flux transitions in the signal, the improvement comprising:

a first differentiator circuit connected to receive said filtered signal and operable to differentiate same to provide a first differentiated signal crossing a value of zero at locations corresponding to peaks of the waveform and having notch portions which at least approach a value of zero at off peak areas of the waveform;

a second differentiator circuit connected to receive said filtered signal and having a state of adjustment to imperfectly differentiate the filtered signal to provide a second differentiated signal crossing a value of zero at locations corresponding to peaks of the waveform and having notch portions which depart from a value of zero at said off peak areas to a greater extent than the notch portions of said first differentiated signal;

a first zero crossing detector connected to receive the first differentiated signal and to detect the zero crossings of same, said first zero crossing detector having a square wave output which may include spurious pulses resulting from misinterpretation of said notch portions of the first differentiated signal as zero crossings;

a second zero crossing detector connected to receive the second differentiated signal and to detect the zero crossings of same, said second zero crossing detector having a square wave output substantially devoid of said spurious pulses;

a flip-flop circuit having data and clock inputs and an output line;

means for applying said output from the second zero crossing detector to the data input of the flip-flop circuit; and means for applying said output from the first zero crossing detector to the clock input of the flip-flop circuit, whereby an output signal is generated on the output line of the flip-flop circuits which reproduces the flux-transitions in the signal while being relatively unaffected by the presence of said spurious pulses in the output of the first zero crossing detector.

3. A method of processing a waveform generated by a magnetic read head which senses the magnetization pattern on a magnetic recording medium, said method comprising the steps of:

filtering selected frequencies from the waveform to provide a filtered signal;

differentiating the filtered signal to produce a first differentiated signal which crosses a value of zero at peaks of the filtered waveform and which may approach a value of zero at off peak areas of the filtered waveform;

imperfectly differentiating the filtered signal to produce a second differentiated signal which crosses a value of zero at locations corresponding to peaks of the filtered signal and which includes notch portions that do not approach a value of zero at said off peak areas;

detecting the zero crossings of said first and second differentiated signals and generating from the detected zero crossings respective first and second binary digital signals shaped in accordance with the detected zero crossings, the first binary digital signal possibly including spurious pulses resulting from misinterpretation of said notch portions as zero crossings and the second binary digital signal being substantially devoid of such spurious pulses;

applying the second square binary digital to a data input of a flip-flop circuit; and applying the first square binary digital to a clock input of said flip-flop circuit, whereby the output of said flip-flop circuit is timed by said first binary digital signal and is relatively unaffected by the presence therein of said spurious pulses.

* * * * *